United States Patent [19]

Brown et al.

[11] Patent Number: 5,218,861
[45] Date of Patent: Jun. 15, 1993

[54] PNEUMATIC TIRE HAVING AN INTEGRATED CIRCUIT TRANSPONDER AND PRESSURE TRANSDUCER

[75] Inventors: Robert W. Brown, Medina; Gary T. Belski, Massillon; William F. Dunn, Stow, all of Ohio

[73] Assignee: The Goodyear Tire & Rubber Company, Akron, Ohio

[21] Appl. No.: 676,121

[22] Filed: Mar. 27, 1991

[51] Int. Cl.⁵ .................................... B60C 23/00
[52] U.S. Cl. ........................ 73/146.5; 152/450; 152/539; 340/445; 340/448
[58] Field of Search .............. 152/450, 539; 116/34 B; 73/146.5, 146.8; 340/446, 447, 448; 200/61.22, 61.23, 61.24, 61.25, 61.26

[56] References Cited

U.S. PATENT DOCUMENTS

| | | | |
|---|---|---|---|
| 3,770,040 | 11/1973 | DeCicco | 152/330 |
| 3,893,228 | 7/1975 | George et al. | 29/580 |
| 4,317,126 | 2/1982 | Gragg, Jr. | 357/26 |
| 4,392,382 | 7/1983 | Myers | 73/708 |
| 4,446,447 | 5/1984 | McNamara | 331/42 |
| 4,543,457 | 9/1985 | Petersen et al. | 200/61.25 |
| 4,578,992 | 4/1986 | Galasko et al. | 73/146.5 |
| 4,588,978 | 5/1986 | Allen | 340/58 |
| 4,695,823 | 9/1987 | Vernon | 340/447 |
| 4,701,826 | 10/1987 | Mikkor | 361/283 |
| 4,730,188 | 3/1988 | Milheiser | 340/825 |
| 4,734,034 | 3/1988 | Maness | 433/68 |
| 4,856,993 | 8/1989 | Maness | 433/68 |
| 4,911,217 | 3/1990 | Dunn et al. | 152/152.1 |

FOREIGN PATENT DOCUMENTS

| | | |
|---|---|---|
| 0301127 | 2/1989 | European Pat. Off. |
| 0364044 | 4/1990 | European Pat. Off. |
| 0364045 | 4/1990 | European Pat. Off. |
| 3912016 | 10/1990 | Fed. Rep. of Germany |
| 3912034 | 10/1990 | Fed. Rep. of Germany |
| 63-306905 | 12/1988 | Japan |
| 8703077 | 12/1987 | Netherlands |
| 8802480 | 10/1988 | Netherlands |
| 8802483 | 10/1988 | Netherlands |
| WO90/12474 | 10/1990 | PCT Int'l Appl. |
| 2214673 | 9/1989 | United Kingdom |

OTHER PUBLICATIONS

ID Expo Proceedings, 1988, pp. 305-1-305-7, Opportunities and Challenges for the Radio Frequency Identification Industry, Ron Ames, Ames & Associates.
Tiris Registration and Identification System, © 1988 by Texas Instruments.
ID Systems, The Debut of TI's RF/ID Technology, Kevin R. Sharp, vol. 10, No. 11, Nov. 1990.
"Near Field Communication", A. Przedpelski, RF Design, Mar./Apr. 1984.

Primary Examiner—Michael W. Ball
Assistant Examiner—Francis J. Lorin
Attorney, Agent, or Firm—David E. Wheeler

[57] ABSTRACT

A pneumatic tire has an integrated circuit transponder which, upon interrogation by an external RF signal, transmits tire identification and tire pressure data in digitally-coded form. The transponder has an antenna adjacent and thereby coupled by electric or magnetic fields to an annular tensile member comprising a bead of the tire. The antenna has lead wires that preferably are positioned between the innerliner of the tire and its continuous carcass ply. The transponder thus is on the axially inner side of the reinforced carcass ply. A pressure transducer is within the transponder and is responsive, preferably through the innerliner material, to pressure within the tire. If the antenna is a coil, the coil is substantially planar in shape and parallel with the reinforced carcass ply. The transponder and pressure transducer also can be attached to the axially inner side of the innerliner.

14 Claims, 5 Drawing Sheets

PNEUMATIC TIRE HAVING AN INTEGRATED CIRCUIT TRANSPONDER AND PRESSURE TRANSDUCER

BACKGROUND AND PRIOR ART

This invention relates to a pneumatic tire having an integrated circuit transponder located within the structure of the tire for use in tire identification and pressure data transmission. More particularly, the invention relates to the combination of a pressure transducer with a pneumatic tire and a transponder. The transponder is a passive device in that it has no source of electrical energy but instead depends upon the receipt of an "interrogation" signal emanating from a source outside of the tire. The interrogation signal is rectified by the circuitry in the integrated circuit transponder, which then utilizes the rectified signal as a source of electrical energy for use in its transmission of an electrical signal digitally encoded to identify the tire. A unique identification number or code can be used for each tire.

Reference is made to commonly-assigned U.S. Pat. No. 4,911,217 issued Mar. 27, 1990, to Dunn et al. which discloses a commercially-available integrated circuit transponder suitable for use in a pneumatic tire and which discloses an electric-field coupled interrogator/transponder system. The disclosure of U.S. Pat. No. 4,911,217 is incorporated herein by reference and is referred to below as the Dunn et al. patent.

An alternative integrated circuit is commercially available from Texas Instruments of Austin, Tex., and is sold under the name TIRIS TM, for Texas Instruments Registration and Identification System. While these integrated circuits are not ideal, they are preferred because of their commercial availability. The integrated circuit disclosed in U.S. Pat. No. 4,911,217 also is preferred because it is the only integrated circuit that has been successfully tested in a location in a pneumatic tire enabling practice of the subject invention.

In the manufacture of pneumatic tires, it is desirable to provide unique numerical identification for each tire as soon as possible during the course of its fabrication. Also, the identification should be easily discernible throughout both the manufacturing process and the life of the tire, and retreading of the tire should not adversely affect identification. If the tire is mounted on a steel or aluminum wheel, as is the normal case, or on a dual wheel assembly, then the tire identification should still be easily acquired by tire owners and users for use in inventory control, record keeping and warranty determination. The ability to identify tires throughout their manufacture is particularly valuable in quality control because the source of manufacturing problems can be much more readily ascertained than is the case in the absence of specific tire identification. Statistical process control and other methods can be used with tire identification to detect process parameters that are going out of control or to detect machinery wear, failure, or maladjustment. These benefits of tire identification practically speaking cannot be obtained unless a radio-frequency transponder is available for incorporation in a tire. The transponder must be quite inexpensive, reliable, and readable from any position around the tire or vehicle wheel on which it is mounted: it also must survive manufacturing processes, be usable during the course of manufacture and must not adversely affect tire life or retreadability. In addition to providing tire identification with a transponder, it is desirable to transmit data concerning the pressure within the tire. This concept is described in EPA No. 0 301 127 dated Feb. 1, 1989 (column 14), which is assigned to Texas Instruments Deutchland GmbH and which is believed to describe the above-mentioned integrated circuit transponder of Texas Instruments.

Destron/IDI of Boulder, Colo. proposed a vehicle tire identification system described in the international application published under the Patent Cooperation Treaty as Publication No. WO90/12474 dated Oct. 18, 1990. This published application, on page 8 and in claim 8, suggests the use of means for sensing the condition of a tire. The publication also references U.S. Pat. No. 4,730,188 to Milheiser, which describes a transponder similar to that disclosed in the Dunn et al patent.

The use of pressure transducers in pneumatic tires, in association with electronic circuitry for transmitting pressure data, is well known, as is exemplified by U.S. Pat. No. 4,578,992 to Galask. However, these pressure-data systems for tires have been plagued by difficulties inherent in the tire environment. Such difficulties include the rugged use the tire and electronic components must undergo, as well as the possibility of deleterious effects on the tire from incorporation of the pressure transducer and electronics in a tire/wheel system.

The invention enables these difficulties to be overcome, while also providing the desired tire numerical identification and data transmission from any position around the tire.

SUMMARY OF THE INVENTION

In accordance with the invention, a pressure transducer is incorporated in an integrated circuit transponder which, in turn, is incorporated in a pneumatic tire. Radio-frequency transmission of tire identification and pressure data is accomplished with this transponder.

More specifically, an integrated circuit transponder is located within the structure of the pneumatic tire for use in its identification or for use in transmitting tire pressure data accumulated at the transponder location. The tire has two spaced beads respectively including an annular tensile member of wound or cabled steel wire. The tire has a tread, sidewalls, an innerliner and a plurality of plies at least one of which is a continuous ply extending between the annular tensile members. Respective ends of the continuous ply are turned axially and radially outwardly about the annular tensile members. The transponder has an antenna and is able to transmit an electrical signal in response to an oscillating electric or magnetic field emanating from a source in contact with or spaced from the tire.

The pressure transducer is incorporated into the transponder as noted above. The transponder antenna is positioned adjacent one of the annular tensile members for electric or magnetic field coupling to such annular tensile member. The transponder, including its pressure transducer, is positioned on the axially inner side of the continuous ply. The pressure transducer is responsive to pressure within the tire. Preferably, the pressure transducer is selected from the group consisting of a piezoresistive transducer, a silicon capacitive pressure transducer, a variable-resistance laminate of conductive ink, and a variable-conductance elastomeric composition.

The transponder may be coupled to the associated annular tensile member with antenna lead wires providing electric-field coupling as taught in the Dunn et al patent. Alternatively, magnetic-field coupling to the annular tensile member may be used, preferably, in the manner taught in concurrently filed and commonly assigned U.S. Patent application Ser. No. 07/676,153 which is entitled "Integrated Circuit Transponder with Coil Antenna in a Pneumatic Tire for Use in Tire Identification". Now, and continuously since the conception of both this invention and that disclosed in the above-identified application, the present inventors and their joint inventors in such application have had obligations of assignment of these inventions to The Goodyear Tire & Rubber Company.

BRIEF DESCRIPTION OF THE DRAWINGS

The invention may be better understood by reference to the detailed description which follows and to the drawings, in which.

DETAILED DESCRIPTION

To facilitate understanding of the invention and claims, the following definitions relating to pneumatic tires are provided:

"Axial" and "axially" refer to lines or directions that are parallel to the axis of rotation of the tire;

"Bead" means that part of the tire comprising an annular tensile member wrapped by ply cords and shaped, with or without other reinforcement elements such as flippers, chippers, apexes, toeguards and chafers, to fit the design rim for the tire;

"Belt" means a ply of parallel cords, woven or unwoven, underlying the tread, unanchored to the bead, and having a cord angle, either left or right, in the range from 17° to 27° with respect to the equatorial plane of the tire;

"Breaker" is a word more generic than belt and includes unanchored plies underlying the tread having cord angles with respect to the equatorial plane forming angles, either left or right, up to 90° with respect to the equatorial plane of the tire;

"Carcass" means the tire structure apart from the belt or breaker structure, tread, undertread, and sidewall rubber over the plies, but including the beads;

"Cord" means one of the reinforcement strands of which the plies in the tire are comprised;

"Cord Angle" means the acute angle, left or right in a plan view of the tire, formed by a cord with respect to the equatorial plane;

"Equatorial plane (EP)" means the plane perpendicular to the tire's axis of rotation and passing through the center of its tread;

"Inner" means toward the inside of the tire and "outer" means toward its exterior;

"Innerliner" means the layer or layers of elastomer or other material that forms the inside surface of a tubeless tire and that contains the inflating fluid within the tire;

"Ply" unless otherwise specified means a continuous layer of rubber-coated parallel cords;

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread, provides traction and contains the fluid that sustains the vehicle load;

"Radial" and "radially" are used to mean directions radially toward or away (outward) from the axis of rotation of the tire;

"Radial-ply tire" means a belted or circumferentially-restricted pneumatic tire in which the ply cords which extend from bead to bead are laid at cord angles between 65° and 90° with respect to the equatorial plane of the tire; and "Tread" means a molded rubber component which, when bonded to a tire casing, includes that portion of the tire that comes into contact with the road when the tire is normally inflated and under normal load.

Reference now is made to the drawings, wherein like numerals or identification refer to like parts in the several figures.

Figure 1:
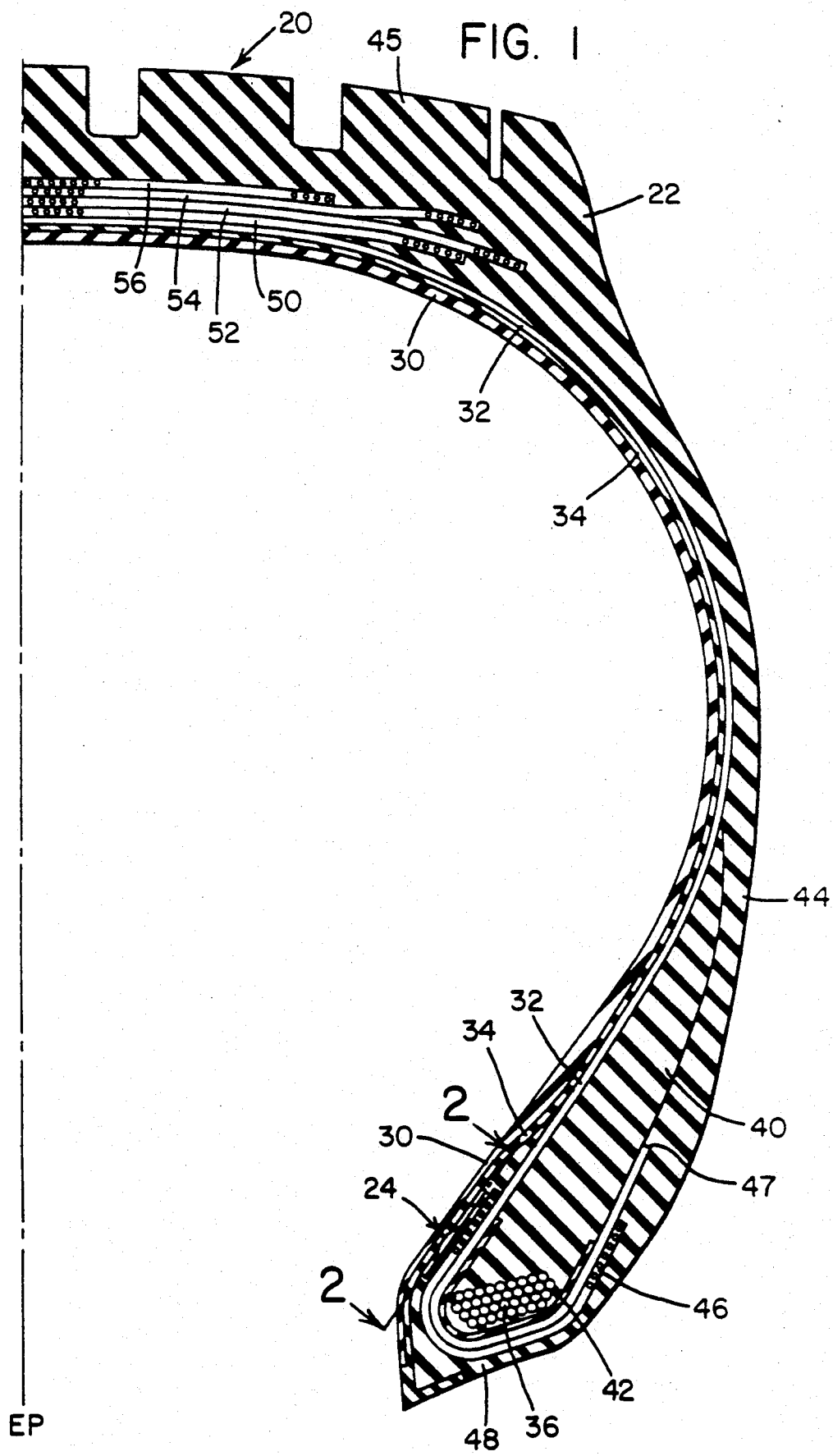
FIG. 1 is a half-sectional view of a radial-ply, steel-reinforced pneumatic truck tire having an integrated circuit transponder which has a coil antenna and a pressure transducer incorporated within it.

FIG. 1 depicts in half sectional view a pneumatic truck tire 20 having an integrated circuit transponder 24 including an antenna coil which functions as a secondary winding coupled to the annular tensile member 36 formed from steel wire and acting as a primary winding in the manner described above. The tire 20 is a medium truck tire having a radial ply construction. The tire includes an innerliner 30, a steel-cord 90° radial carcass ply 32 having its respective ends 47 on either side of the tire turned axially and radially outwardly about the respective spaced-apart annular tensile members 36, formed of cable or wound steel wire, in the respective beads of the tire. The beads include an apex 40, a fabric reinforced flipper 42 surrounding the wires in the annular tensile member 36, and a steel-reinforced chipper 46. The apex rubber 40 typically is considerably harder than the rubber in the sidewall 44 and tread 45 of the tire. Between the innerliner 30 and the steel-reinforced ply 32 of the tire is a rubber barrier material 34 which terminates near the toe region 48 of the tire.

The tire 20 further includes a belt or breaker structure including a belt or breaker ply 50 and low-cord angle belt plies 52, 54 and 56. These plies are reinforced with steel cord.

Figure 4:
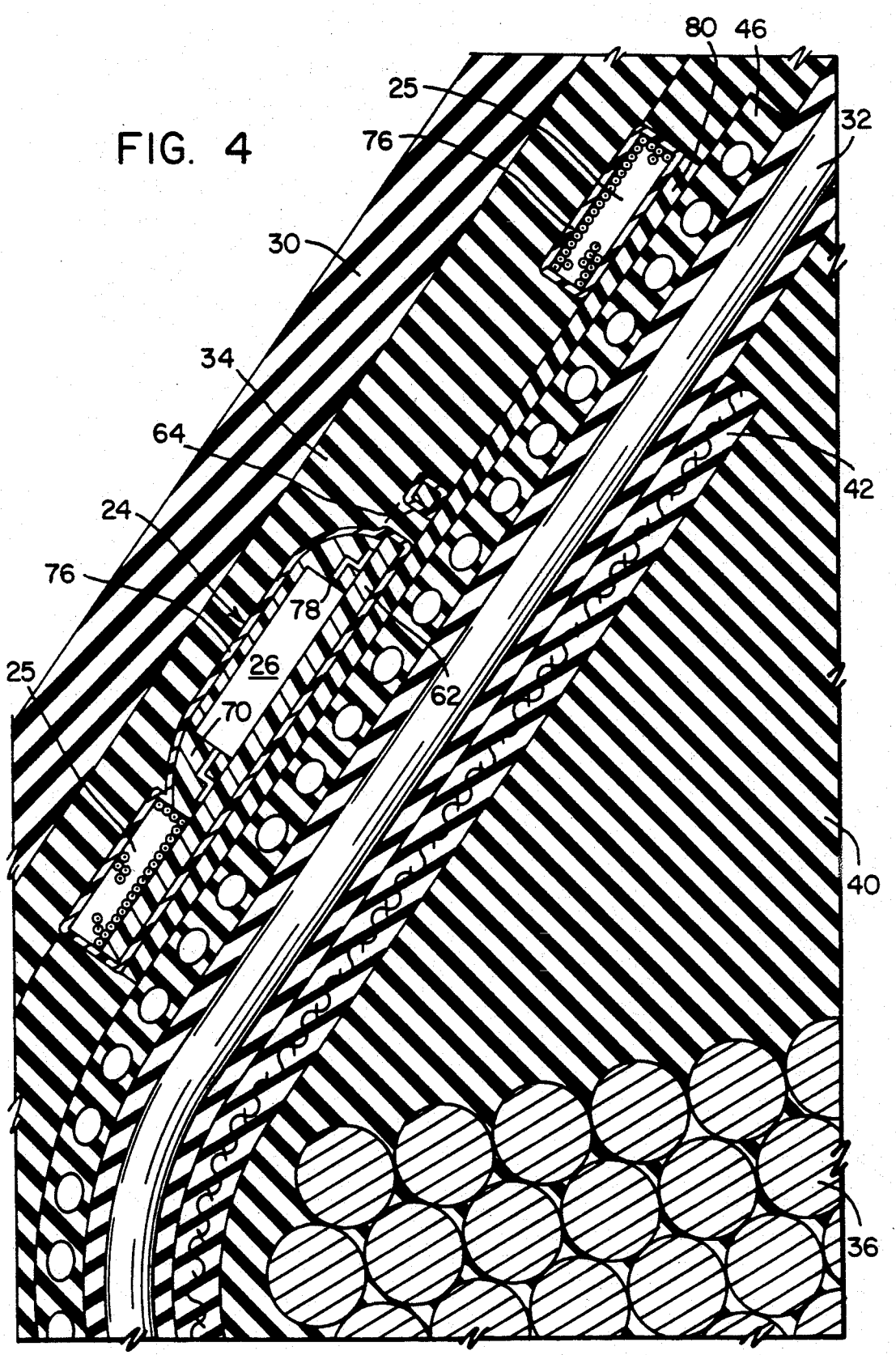
FIG. 4 is an enlarged view, on the scale of that shown in FIG. 3; taken along the line 4—4 in FIG. 2, and further details the integrated circuit transponder, antenna coil, pressure transducer, and their relationship to the circuit board, and also shows the bead wires or annular tensile member forming the primary winding for which the antenna coil of the transponder is the secondary winding.
Figure 5:
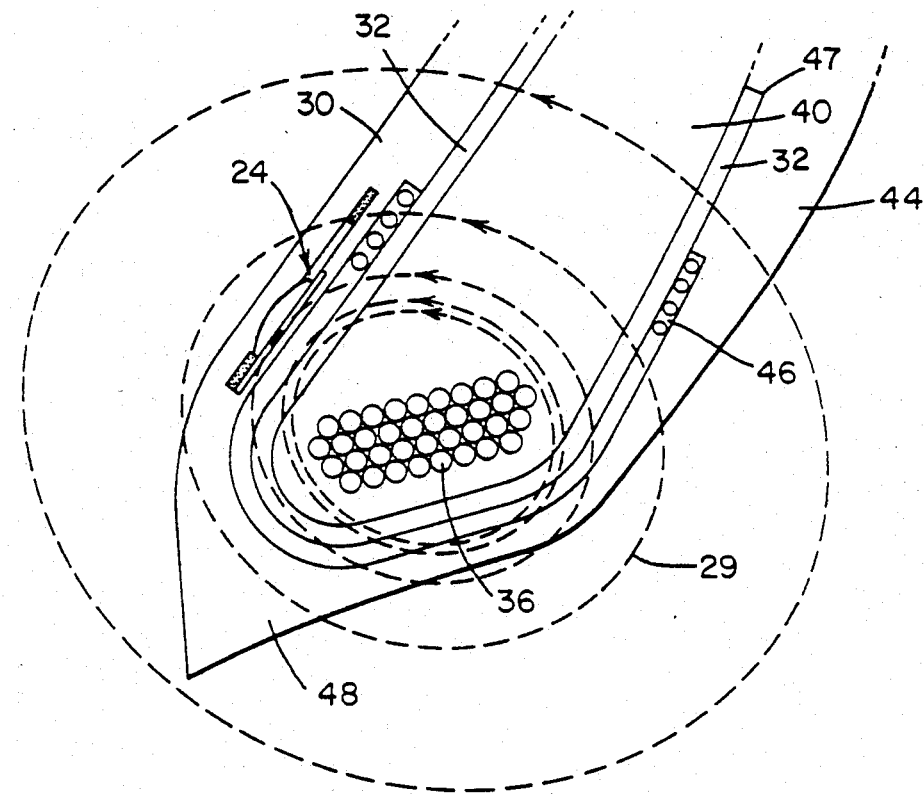
FIG. 5 is a diagrammatic view of the bead area of a pneumatic tire illustrating the integrated circuit transponder positioned between the innerliner and continuous ply of the tire, and further illustrating the magnetic field coupling of the annular tensile member or bead wire to the antenna coil of the transponder during interrogation of the transponder by a source producing such magnetic field outside the structure of the tire.
Figure 6:
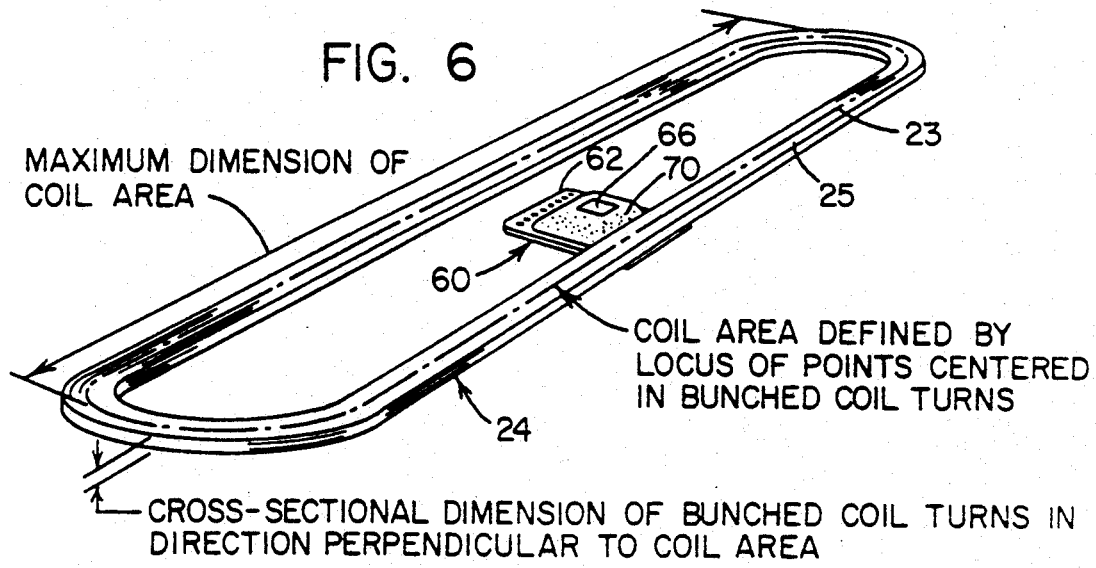
FIG. 6 illustrates the integrated circuit transponder and its antenna coil and pressure transducer as existing apart from the structure of the tire.

It may be seen in FIGS. 1 through 5 that the integrated circuit transponder 24, the detail of which may best be seen in FIG. 6, is positioned with its substantially planar antenna coil 25 parallel with the continuous ply 32 extending between the annular tensile members 36 and is adjacent the annular tensile member 36. Also, the transponder 24 is similarly positioned if the transponder antenna utilizes the electric-field coupling disclosed in Dunn et al. In such case, two lead wires would extend in opposite directions from the integrated circuit in the transponder, both lead wires would be substantially parallel with the continuous ply, and one of the lead wires would be close to the annular tensile member. Preferably, the continuous ply would be reinforced with a nonconductive cord material.

The transponder 24 is positioned on the axially inner side of both the ply 32 and the chipper 46. Thus, the transponder is between these components and the elastomeric materials comprising the barrier 34 and innerliner 30. The transponder preferably is positioned at a location which maximizes the oscillating voltage generated in the transponder antenna coil 25 during interrogation as a result of secondary coupling to the annular tensile member 36 as a primary winding.

The substantially planar coil antenna 25 during transponder interrogation is coupled by a magnetic field to the adjacent annular tensile member 36. This is the preferred antenna and coupling technique for use in a tire having a steel-reinforced continuous carcass ply 32. However, electric field coupling, such as is taught in the Dunn et al patent, may prove to be less expensive or otherwise more desirable for use in passenger or other types of tires that typically do not have steel carcass plies.

With both magnetic field and electric field coupling to the annular tensile member adjacent the antenna, the antenna comprises elongated lead wires which extend in opposite directions from the integrated circuit in the transponder 24. Preferably, these lead wires, and the entire coil in the case of magnetic field coupling, are substantially parallel with the continuous ply 32 of the tire.

Figure 2:
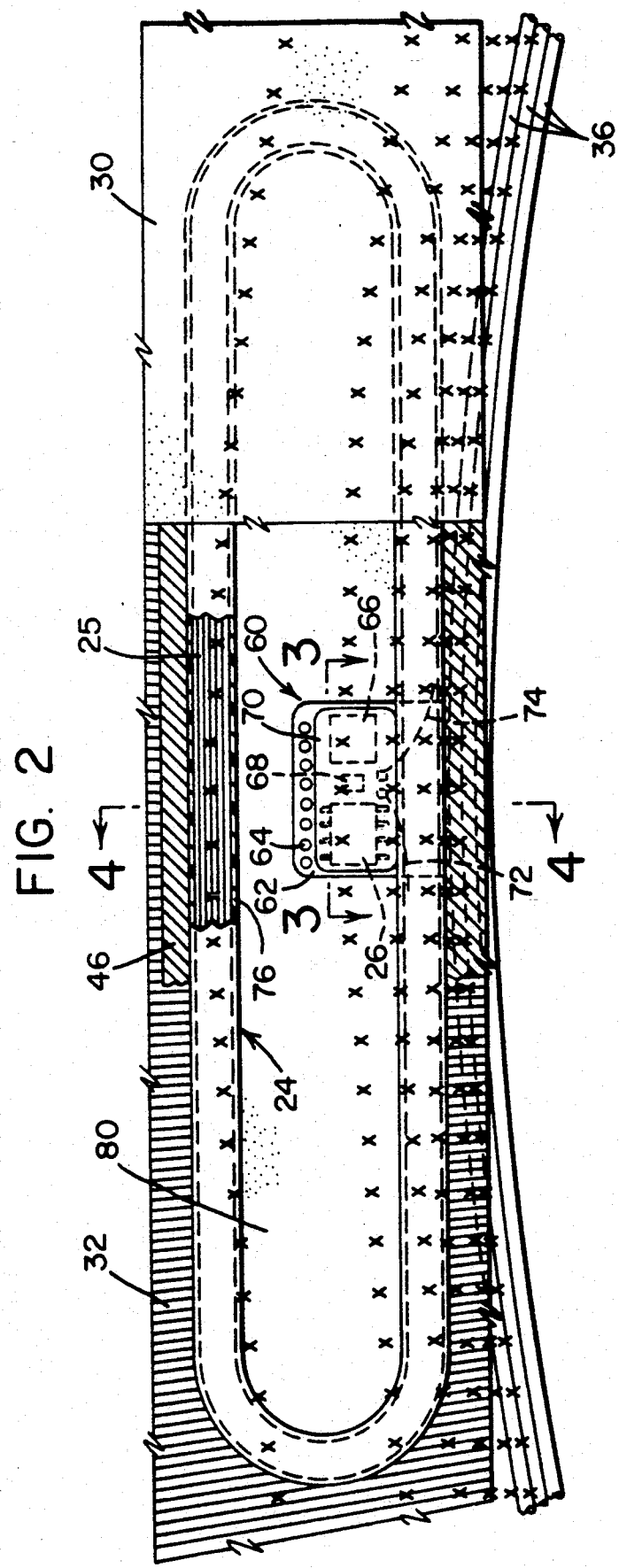
FIG. 2 is an enlarged sectional view of the integrated circuit transponder, including antenna coil and pressure transducer, within the tire of FIG. 1, the section being taken along the line 2—2 in FIG. 1.

With reference now to FIG. 2, which is taken along the line 2—2 in FIG. 1, the transponder 24 is illustrated with associated antenna coil 25 positioned with its enclosed area parallel with that of the ply 32. The long lower side of the oblong or elongated antenna coil 25 is positioned very near (adjacent) the annular tensile member 36 partially shown in FIG. 2. Of course, the annular tensile member 36 has a curvature and the antenna coil 25 need not precisely follow this curvature. In fact, the transponder 24, when positioned between the ply 32 and the innerliner 30 as illustrated in FIGS. 1 through 5, is applied to the innerliner or barrier 34 materials prior to the chipper 46 and the ply 32 being laminated onto these elastomeric materials on the tire building drum conventionally used during tire manufacture. Shaping of the tire 20 into a toroidal configuration causes the steel cords in the ply 32 to diverge as the radius of the shaped tire increases, and this causes some distortion in the antenna coil 25 during tire manufacture. Ideally, the coil would have a kidney or banana shape in the finished tire such that the coil curvature would follow that of the annular tensile member 36.

The transponder 24 includes an integrated circuit 26 mounted on a circuit board shown generally with its various components at 60. The circuit board 60 is adhered to the antenna coil 25 with a suitable epoxy or other adhesive compatible with the polyester insulation provided on the wire forming the antenna coil 25. The printed circuit board has openings 64 through which elastomer may flow to increase the adhesion of the transponder 24 to the other tire components. The holes 64 can have a conductive plating material for use as programming and test pads during transponder manufacture. A capacitor 68 is provided for electrical connection in parallel with the coil winding, the leads 72 and 74 of which are connected to electrodes of the transponder 24 and its integrated circuit 26 substantially in the manner that the antennas illustrated and described in the Dunn et al patent are connected.

The numeral 66 denotes a space or location in or on the circuit board 62 that receives a pressure transducer. At this time, it is preferred that the area 66 contain a variable-conductance elastomeric composition of the kind described in concurrently filed and commonly assigned U.S. Patent application Ser. No. 07/675,842, now U.S. Pat. No. 5,143,967, of Krishnan et al and entitled "Conductive Rubber Composition". In the use of this material as a pressure transducer, the surface conductance may be measured via conductive elements on circuit board 62 in contact with the elastomeric composition. Bulk material conductivity also may be used.

The lines of X's in FIG. 2 depict the magnetic field lines uniformly distributed along the circumference of the annular tensile member 36, but varying in intensity in an exponentially decreasing manner as a function of radial distance from such tensile member. The tensile member acts as a primary winding of a transformer coupling the magnetic field to the secondary winding 25 in the transponder 24.

Figure 3:
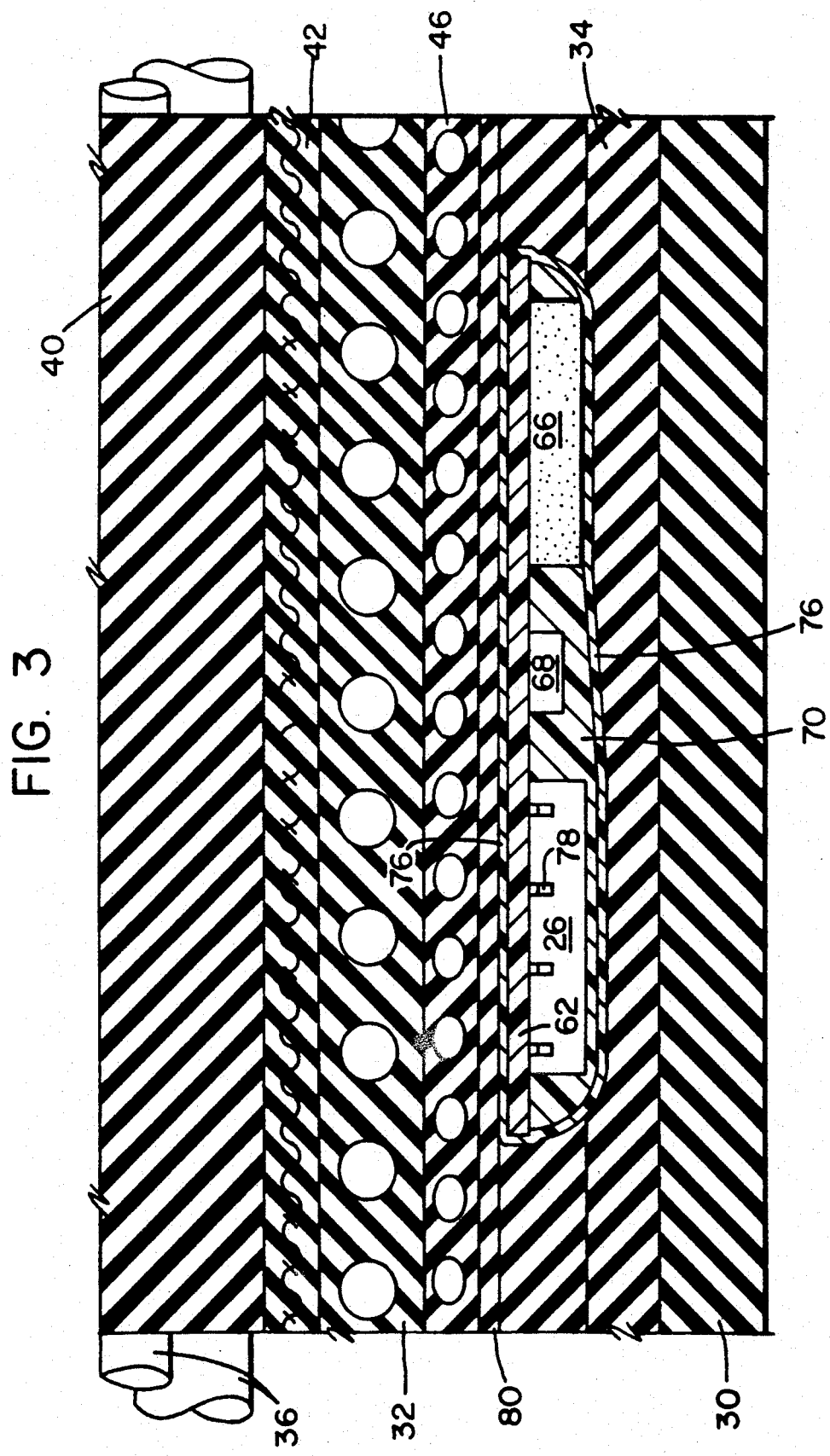
FIG. 3 is a further enlarged sectional view of the integrated circuit transponder and antenna coil shown in FIG. 2, the view being taken along the line 3—3 in FIG. 2 and depicting in detail the circuit board on which the integrated circuit is mounted along with the capacitor and other materials contained within the laminated structure of the tire.

FIG. 3 is taken along the line 3—3 in FIG. 2 and illustrates in enlarged view the lead frame connectors 78 of the integrated circuit 26. Also shown is the adhesive material 76 preferably applied to the transponder 24 prior to its insertion in the tire. The flipper 42 is illustrated, as is a gum material 80 that may be applied to one or both sides of the transponder 24 prior to its being laminated in the tire structure during tire manufacture.

Currently, the adhesive 76 is applied in two steps consisting of a primer coat followed by a top coat.

The primer is a commercial material made by Lord Corporation, of Erie, Pa. The material, designated AP133, is applied by brushing on a thin coat or by dipping and allowing the excess to drain off the transponder 24. Drying is at room temperature in air for 5-10 minutes until the coated device is dry to the touch.

The top coat also is a commercially available material made by Lord Corporation. This material, known as ChemLock 250 TM, is applied by brushing on a thin coat or by dipping and allowing the excess to drain off the transponder. Drying is at room temperature in air for 5-10 minutes until dry to the touch.

The treated transponder 24 may be placed between thin sheets of gum 80 (on one side only or on both sides) and pressed to remove air bubbles from the laminate. After this the transponder 24 may be placed in the tire 20 at a suitable time during tire manufacture. With the illustrated location of the transponder 24, the transponder 24 would be applied directly to the barrier material 34 after it and the innerliner had been applied to the tire building drum.

In the enlarged view of FIG. 4, taken along the line 4—4 in FIG. 2, the relationship of the antenna coil 25 to the other components of the transponder 24 is clearly illustrated. The proximity of the antenna coil 25 to the wires in the annular tensile member 36 is depicted as is the packaged integrated circuit 26 with its lead frame components 78.

The coil lead wires 72 and 74 extend in opposite directions from the circuit 26 after leaving their respective junctions with the printed circuit board terminals. The junctions and the components 26 and 68 are coated with a suitable epoxy material 70 or other encapsulant material suitable for use with elastomeric compositions and electronic components. Materials currently preferred are HYSOL TM FP4322-ES4322 and HYSOL TM FP4340-ES4340 available from Dexter Corporation, Electronic Materials Div., Olean, N.Y. and Industry, Calif.

In FIG. 5, the previously-described location for the transponder 24 is illustrated in diagrammatic form in relation to the magnetic flux lines 29 emanating from the annular tensile member 36 during transponder interrogation. Transponder 24, and the pressure transducer at 66 within the transponder, is positioned between the innerliner 30 and the continuous ply 32. More specifically, the pressure transducer and transponder are located between the innerliner and the steel-reinforced ply 32 or chipper 46; the chipper, along with ply 32, is turned axially and radially outwardly about the annular tensile member 36. This not only permits the magnetic field coupling desired for excitation of the transponder and its data transmission, but also is advantageous because the steel-reinforced plies 32 and 46, as well as the tensile member 36 and apex 40, form rigid backings for the pressure transducer. Pressure within the inflated pneumatic tire is transmitted to the pressure transducer at 66 (FIGS. 2, 3 and 6) through the elastomeric innerliner material and through the elastomeric barrier ply 34 if present. The circuit board 62 also may form a rigid backing for the pressure transducer.

In a tire that has already been manufactured, the transponder 24 and incorporated pressure transducer may be attached to the axially inner side of the innerliner 30 by means of a tire patch or similar material or device. However, this after-tire-manufacture installation of the transponder and pressure transducer is much less desirable than the installation shown in FIG. 5 because the magnetic field coupling is decreased and the backing for the pressure transducer is less rigid.

The dot-dash line in FIG. 6 represents the locus of points defining the area enclosed by the coil 25 and is located at the midpoint of the 70 turns included in this preferred embodiment of the coil. It may be seen that coil 25 is essentially flat, that is, its cross-sectional dimension in the direction perpendicular to the coil's area is much, much less than the width and length dimensions of such area.

The opening or location 66 in or on the circuit board 62 accommodates the pressure transducer incorporated in the transponder. The transponder is positioned between the innerliner 30 and the ply 32, as shown in FIG. 1, or is positioned on the axially interior side of the tire by means of a patch or similar device.

The pressure transducer may be made from a pressure sensitive elastomeric material as previously described or may be fabricated from conductive inks adhered to film materials, such as are commercially available from Tekscan Inc of Boston, Mass.; the Tekscan materials provide a change in conductivity as a function of applied pressure. Alternatively, the pressure transducer positioned in or on the circuit board at 66 of the transponder 24 may be a silicon piezo-resistive pressure transducer or a silicon capacitive pressure transducer. Of course, suitable connection to the integrated circuit 26 and data interpreting for actual pressure sensing is required; the integrated circuit may include a counter or register or other means for digitizing the pressure sensor data and for transmitting it along with or apart from any tire identification data stored within the memory contained within the integrated circuit.

The pressure sensor used with the transponder 24 preferably will have an operating temperature range of up to 110° C. and will be able to withstand a manufacturing temperature of approximately 177° C. For truck tire applications, the pressure sensor must have an operating pressure range of from about 50 to 120 pounds per square inch and should be able to withstand pressure during manufacture of the tire in which it is incorporated of up to 400 pounds per square inch. The accuracy, including the sum of all contributors to its inaccuracy, should be on the order of plus or minus 3% of full scale. Repeatability and stability of the pressure signal must be as required for the specified accuracy range. Of course, an electrical signal is preferred and may be a variable voltage, current, capacitance, or resistance.

The pressure transducer preferably is mounted in or on the printed circuit board 62 as may best accommodate its design and packaging. Electrical connection must be made to the circuit board and to circuitry within the integrated circuit 26 of the transponder. The integrated circuit will provide a supply voltage or current for the transducer included within the pressure sensor. Portions of the circuitry required to transform the signal produced by the pressure transducer into digital data that can be transmitted by the integrated circuit 26 during transponder interrogation may be included in the integrated circuit 26 as earlier mentioned or may be included in a separate device.

The pressure transducer may include another elastomeric material having a variable conductivity, such as that described in R R Juengel, Cabot Corporation, "Compounding for Electrical Conductivity", Technical Report RG-128 (Revision No. 2). In such case the elastomer will be within the opening at location 66 depicted in FIGS. 2 and 3.

If the pressure transducer is mounted on the printed circuit board 62, the printed circuit board is positioned between the rigid portion of the tire formed by the continuous ply 32 and/or chipper 46. Thus, pressure within the pneumatic tire during its inflated state will be transmitted through the innerliner 32 and barrier ply 34 or other material (for example, epoxy can be used over the diaphragm of a silicon capacitive pressure sensor and still transmit applied force to the diaphragm) to the pressure transducer mounted on the printed circuit board. The rigid printed circuit board, and reinforced ply materials 32 and 46, allow the pressure within the tire to act upon the pressure transducer with a somewhat reduced magnitude due to the presence of the elastomeric innerliner and barrier or other material covering the pressure transducer.

If the pressure transducer is a piezoresistive device, such as one of those shown and described in U.S. Pat. No. 3,893,228 issued in 1975 to George et al. or in U.S. Pat. No. 4,317,126 issued in 1982 to Gragg, Jr., or a silicon capacitive pressure sensor, such as that illustrated in U.S. Pat. No. 4,701,826 issued in 1987 to Mikkor, then it preferably will have a size less than 4 square millimeters. The pressure transducer may include circuitry integral with it for converting, for example, a capacitance variation into a voltage, current or frequency variation. Circuitry for generating capacitive to voltage and frequency conversion, respectively, are illustrated in U.S. Pat. No. 4,392,382 issued in 1983 to Myers and U.S. Pat. No. 4,446,447 issued in 1984 to McNamara.

Neither the thermal hysteresis nor pressure hysteresis of the pressure transducer should exceed one percent of its full-scale signal output span. The transducer response time, after voltage application, should be one millisecond, but this may be lengthened to keep the current level down and is dependent upon the requirements of the integrated circuit transponder and its abilities to transmit the pressure data along with tire identification data. For passenger tire applications, the pressure range should be from about 15 psi to 60 or 80 psi.

As noted above, the transponder circuit board 62 has a capacitor 68 mounted on it and connected in parallel with coil 25. This forms a parallel-resonant circuit. Because a majority of the area of coil 25 is fitted with an elastomeric material when manufactured into the tire, which incidentally and very desirably is more flexible than the composite structure forming ply 32, the resonant frequency is affected. Appropriate adjustment of components for this is required. At a desired frequency of 460.8 KHz, the resonant frequency in air must be increased about 10 KHz.

Based upon the foregoing description of the invention, what is claimed is:

1. A pneumatic tire having an integrated circuit transponder located within the structure of the tire for use in tire identification and pressure data transmission, the tire having two spaced beads comprising steel wire, the tire having a tread, sidewalls, an innerliner and a plurality of plies at least one of which is a continuous ply extending between the annular tensile member, respective ends of the continuous ply being turned axially and radially outwardly about the bead, the transponder having an antenna and being able to transmit an electrical signal in response to an oscillating electric or magnetic field emanating from a source in contact with or spaced from the tire, the pneumatic tire, and transponder being characterized by:

a pressure transducer being incorporated into the transponder, the transponder antenna being positioned adjacent one of the beads for electric or magnetic field coupling thereto, and the transponder, including its pressure transducer, being positioned on the axially inner side of the continuous ply, the pressure transducer being responsive to pressure within the tire.

2. A pneumatic tire having an integrated circuit transponder and incorporated pressure transducer as in claim 1, the transponder having an antenna lead coupled to the bead by an electric field during transponder interrogation.

3. A pneumatic tire having an integrated circuit transponder and incorporated pressure transducer as in claim 1, the pressure transducer being positioned between the innerliner of the tire and the continuous ply and being responsive through the innerliner to pressure within the tire.

4. A pneumatic tire having an integrated circuit transponder and incorporated pressure transducer as in claim 2, the pressure transducer being positioned between the innerliner of the tire and the continuous ply and being responsive through the innerliner to pressure within the tire.

5. A pneumatic tire having an integrated circuit transponder and incorporated pressure transducer as in claim 1, the transponder antenna having lead wires extending in opposite directions from the integrated circuit, the lead wires being substantially parallel with the continuous ply of the tire.

6. A pneumatic tire having an integrated circuit transponder and incorporated pressure transducer as in claim 5, the transponder having an antenna lead coupled to the bead by an electric field during transponder interrogation.

7. A pneumatic tire having an integrated circuit transponder and incorporated pressure transducer as in claim 5, the antenna being a substantially planar coil, the plane of the antenna coil being substantially parallel with the continuous ply of the tire.

8. A pneumatic tire having an integrated circuit transponder and incorporated pressure transducer as in claim 7, the antenna coil and pressure transducer being located radially outwardly of the bead, being located between innerliner of the tire and the continuous ply and being responsive through the innerliner to pressure within the tire.

9. A pneumatic tire having an integrated circuit transponder and incorporated pressure transducer as in claim 1, the pressure transducer being selected from the group consisting of a piezoresistive transducer, a silicon capacitive pressure transducer, a variable-conductance laminate of conductive ink, and a variable-conductance elastomeric composition, the pressure transducer being electrically coupled to the integrated circuit of the transponder, the integrated circuit converting the response of the pressure transducer to digital data transmitted by the transponder during transponder interrogation.

10. A pneumatic tire having an integrated circuit transponder and incorporated pressure transducer as in claim 2, the pressure transducer being selected from the group consisting of a piezoresistive transducer, a silicon capacitive pressure transducer, a variable-conductance laminate of conductive ink, and a variable-conductance elastomeric composition, the pressure transducer being electrically coupled to the integrated circuit of the transponder, the integrated circuit converting the response of the pressure transducer to digital data transmitted by the transponder during transponder interrogation.

11. A pneumatic tire having an integrated circuit transponder and incorporated pressure transducer as in claim 3, the pressure transducer being selected from the group consisting of a piezoresistive transducer, a silicon capacitive pressure transducer, a variable-conductance laminate of conductive ink, and a variable-conductance elastomeric composition, the pressure transducer being electrically coupled to the integrated circuit of the transponder, the integrated circuit converting the response of the pressure transducer to digital data transmitted by the transponder during transponder interrogation.

12. A pneumatic tire having an integrated circuit transponder and incorporated pressure transducer as in claim 5, the pressure transducer being selected from the group consisting of a piezoresistive transducer, a silicon capacitive pressure transducer, a variable-conductance laminate of conductive ink, and a variable-conductance elastomeric composition, the pressure transducer being electrically coupled to the integrated circuit of the transponder, the integrated circuit converting the response of the pressure transducer to digital data transmitted by the transponder during transponder interrogation.

13. A pneumatic tire having an integrated circuit transponder and incorporated pressure transducer as in claim 1, the transponder and pressure transducer being attached to the axially inner side of the innerliner.

14. A pneumatic tire having an integrated circuit transponder and incorporated pressure transducer as in claim 5, the transponder and pressure transducer being attached to the axially inner side of the innerliner.

* * * * *